INVENTOR.
ALBERT W. BROWN
BY FOWLER, KNOBBE
& MARTENS
ATTORNEYS.

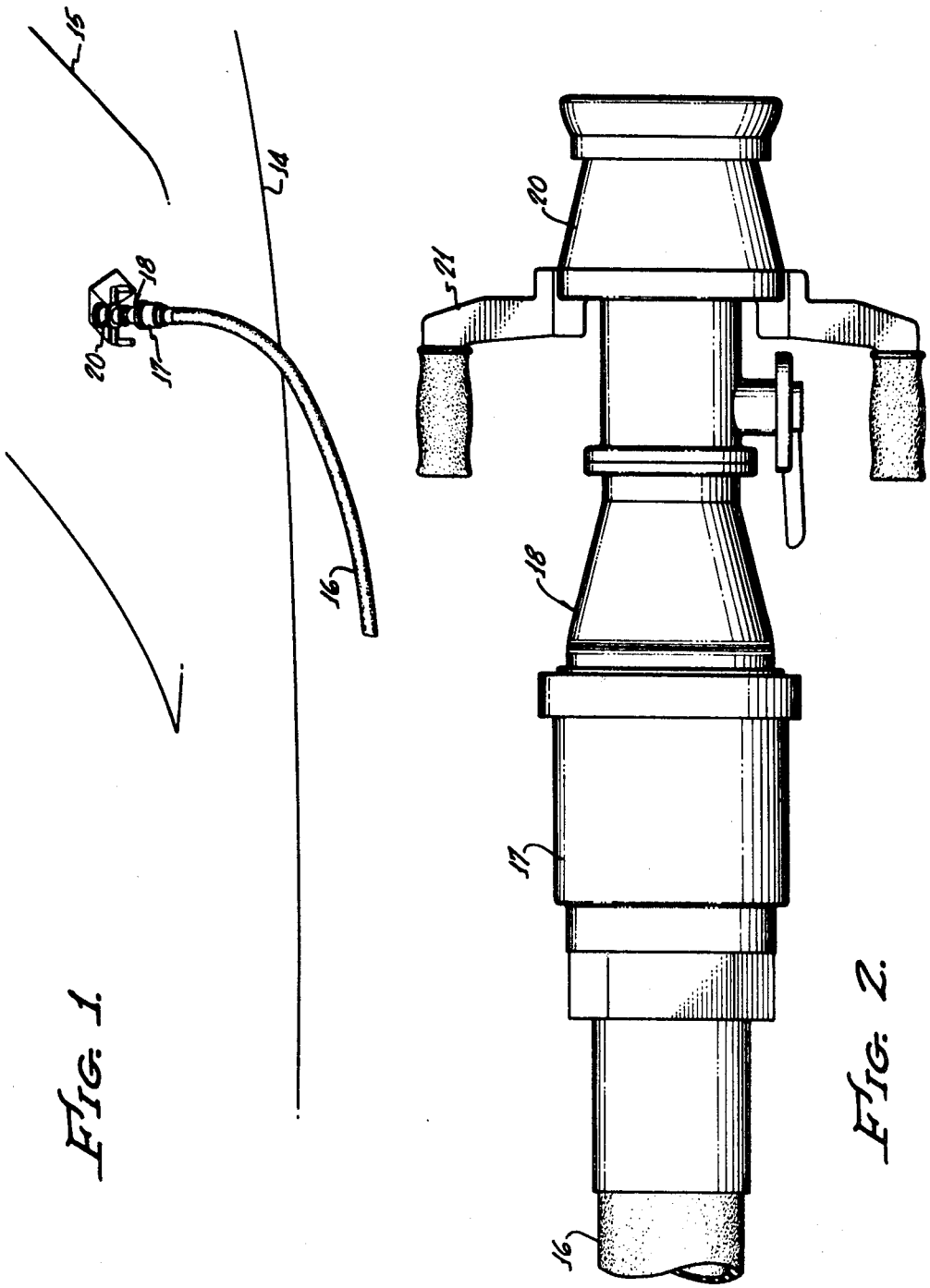

INVENTOR.
ALBERT W. BROWN
BY
FOWLER, KNOBBE
& MARTENS
ATTORNEYS.

United States Patent Office 3,605,788
Patented Sept. 20, 1971

3,605,788
FUELING PRESSURE REGULATOR
Albert William Brown, Newport Beach, Calif., assignor to The J. C. Carter Company, Costa Mesa, Calif.
Filed Mar. 9, 1970, Ser. No. 17,434
Int. Cl. G05d 7/01
U.S. Cl. 137—220
17 Claims

ABSTRACT OF THE DISCLOSURE

A piston-like valve member is slidably mounted on a support centrally positioned within a tubular housing at the end of a fuel hose to control fuel flow through an annular path around the valve member. A fixed shroud spaced from the housing slidably receives the valve member, and sensing holes within the shroud permit fluid pressure in the flow path to enter the shroud and react against a downstream facing working surface on the valve member. The sensing holes are placed along a restricted throat in the flow path so that at high flow rate settings the valve member is subjected to pressures which are substantially less than the actual pressure downstream of the throat, with the result that downstream pressure increases at high flow rates. Two dynamic seals in the structure are adjacent an ambient pressure cavity within the valve member so that any leakage is to that cavity and hence does not affect the accuracy of no flow or low flow rates.

---

This invention relates to pressure regulators and more particularly to a regulator adapted to be positioned at the end of an aircraft fueling hose to sense the fuel pressure in the aircraft so as to prevent excessively high pressures in the aircraft fuel system while permitting high fuel flow rates.

Because of the need to prevent pressure build-ups in an aircraft beyond a certain level while maintaining a desired pressure, it has become standard practice to utilize a pressure regulator at the end of the fuel hose at the point where the hose is to be attached to the aircraft to control the back pressure, or the pressure in an aircraft fuel system. While regulators currently exist on the market that are quite capable of performing this function at relatively low flow rates, it has been found that at high flow rates they suffer from delivery pressure deterioration. That is, with a regulator set for a certain maximum, the downstream pressure attainable decreases at high flow rates with the result that the flow rate desired is not obtained. For example, one of the standard regulators on the market set to prevent more than 50 p.s.i.g. downstream at low fuel flow will only deliver 35 p.s.i. to the nozzle with a pump set to deliver 500 gallons per minute, regardless of the inlet pressure available. This pressure deterioration is due partly to the spring force reduction as the unit opens and mainly because of the flow dynamics at the exit of the regulator and the geometry surrounding the pressure sensing piston. Also, some of the regulators currently available do not satisfactorily limit the pressure at zero or low flow because of some small internal leakage past the dynamic seals.

It is, of course, important that high flow rates under proper pressure be attained so that refueling operations for aircraft can be expeditiously handled. In view of the cost of present day aircraft, each minute of idleness for the craft is quite expensive.

Accordingly, it is desirable that a pressure regulator be provided which does not have the disadvantages set forth, primarily the pressure deterioration at high flow rates. It is also desirable that the regulator be accurate at low flow rates. In addition, it is of course important that the regulator be highly reliable so that malfunctioning and the resultant costly delays are avoided.

Briefly stated, the pressure regulator of the invention comprises a tubular housing and a support member extending inwardly from the housing walls and centrally positioned within the housing to define an annular flow path. An annular valve seat is formed along the flow path and a valve member is slidably mounted on the support member to cooperate with the valve seat for controlling flow through the flow path. A hollow shroud closed on one end and substantially open on the other end is centrally supported within the housing and positioned to slidably receive the valve member. The shroud and the valve member define a chamber with a working surface of the valve member forming a wall of the chamber. One or more sensing ports are formed in the shroud so that the pressure in the flow path surrounding the sensing ports is transmitted to the working chamber to react against the enclosed valve member.

By positioning the valve at the end of a fueling hose with the valve seat at the upstream end and the shroud positioned downstream from the valve seat with its closed end extending downstream, the valve member senses a pressure which is related to the downstream pressure, but the exact pressure which it does sense is determined by the characteristics of the flow path adjacent the sensing holes. Preferably, the shroud and the surrounding housing are formed so that the flow path increases from a restricted throat in a downstream direction so that a diffusing action occurs after the fluid passes the throat. The sensing holes are positioned near the throat so that the pressure which is sensed by the valve member is lower than the actual downstream pressure with the result that the regulator permits sufficient flow to maintain the high volume flow characteristics desired. For example, it has been found that at a flow rate setting of 500 gallons per minute, a pressure of 50 p.s.i.g. on the downstream side can be maintained with an inlet pressure of 58 p.s.i.g. This is in contrast with known regulators which are unable to maintain a flow rate of 500 gallons per minute even with inlet pressures much higher than 58 p.s.i.g. For a better understanding of the construction of the regulator and a further appreciation of its features and advantages, refer now to the following detailed description and drawings in which:

FIG. 1 is a schematic perspective view illustrating the regulator in operation at the end of a fueling hose and attached to an aircraft wing tank;

FIG. 2 is a side elevational view of the regulator and adjacent elements on the end of a fuel hose;

Figure 3:
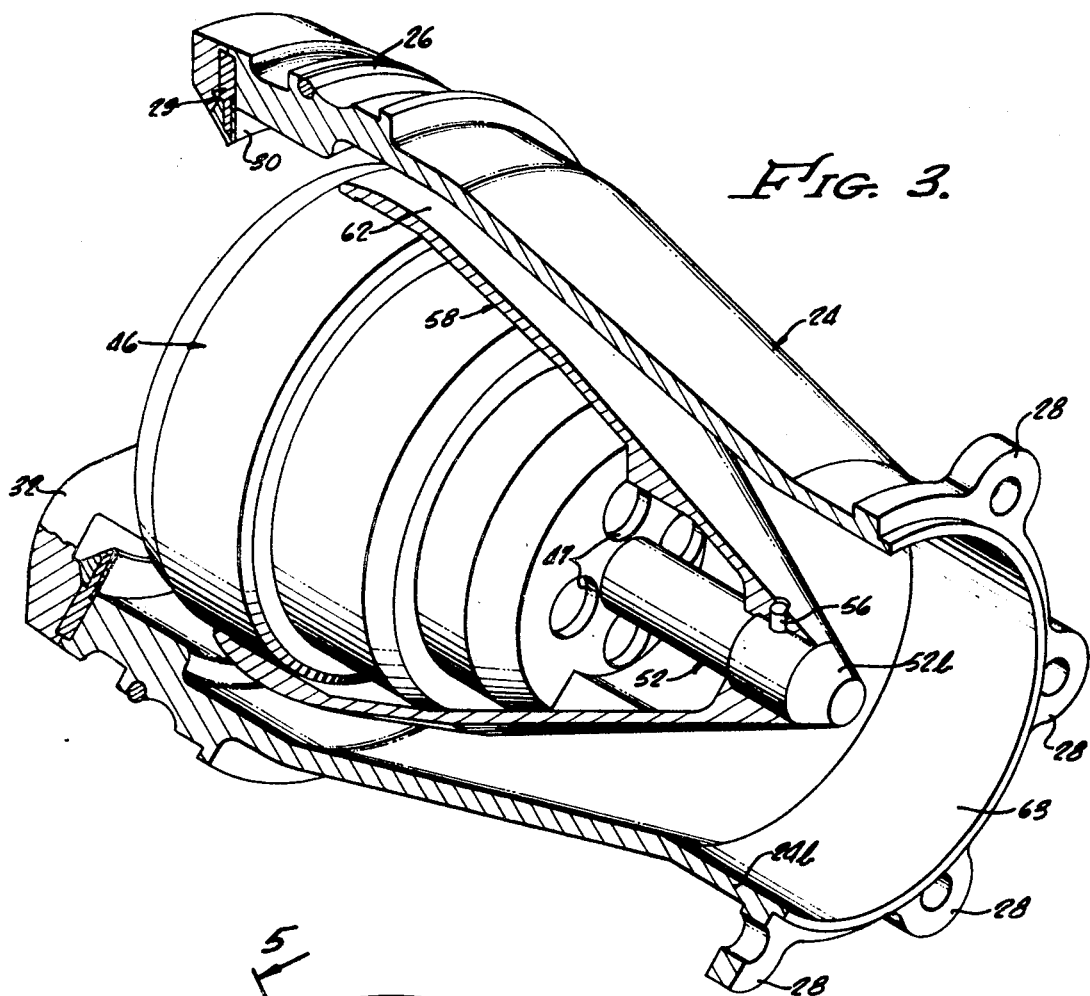
FIG. 3 is a perspective view of the regulator taken from the dowstream end and with a portion of the housing and the shroud cut away so as to be shown in cross-section.
Figure 4:
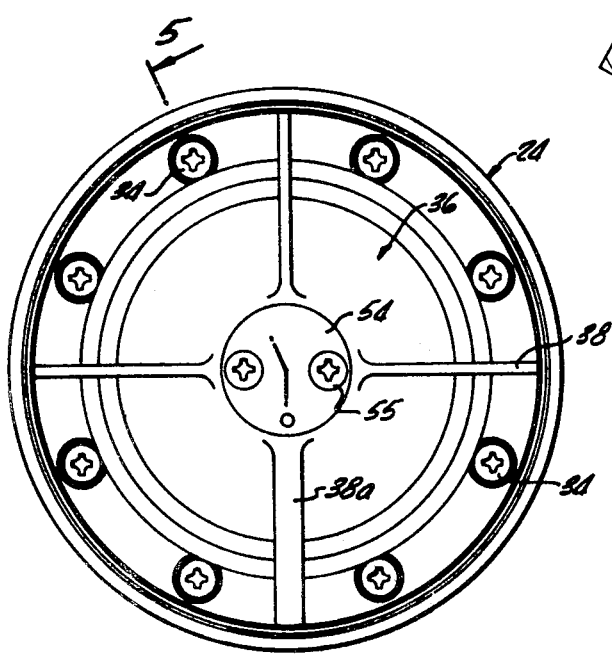
FIG. 4 is an elevational view of the upstream end of the regulator.

Referring first to FIGS. 1 and 2 there is shown an aircraft 14 having a wing 15 with a fuel hose 16 shown connected to one or more tanks (not shown) within the aircraft. More specifically, the hose is shown as having a swivel fitting 17 on its end which is in turn attached to a pressure regulator and automatic shut-off means 18 that leads to a nozzle assembly 20 which supplies lines within the aircraft leading to the tanks. A pair of handles 21 facilitate convenient handling of the hose while making connections to the aircraft.

Referring to FIGS. 3–8, the pressure regulator of the invention may be seen to include a tubular housing 24 having an upstream end 24a which tapers to a smaller diameter downstream end 24b. The upstream end 24a is provided with an annular groove 26 and a retaining wire 27 for attachment to a retaining ring (not shown) carried by the fitting 17 of the hose 16 and the downstream end 24b is provided with a plurality of lugs 28 for attachment to the nozzle assembly. Adjacent the upstream end 24a, there is provided an inwardly extending annular valve seat 30 formed of a suitable material and held in place by a valve seat support 29 and a clamping ring 32 attached by suitable threaded fasteners 34 to the upstream end 24a of the housing.

A support member 36 is centrally positioned within the housing adjacent the upstream end and supported by four ribs 38 which extend inwardly from and integral with the clamping ring 32. As can be seen from FIGS. 4 and 5, the support member 36 has a substantially imperforate disk-like end 36a which is spaced from the surrounding housing so that the valve seat 30 and the support member 36 define an annular inlet 37 to the housing 24.

The periphery of the support member 36 is provided with an outer cylindrical surface 36b having an annular groove 36c formed therein in which is positioned a resilient O-ring 40 or other suitable seal. Positioned downstream from this outer cylindrical surface is an inner cylindrical surface 36d having a smaller diameter than that of the outer surface 36a, and similarly having an annular groove 36e in which is positioned an O-ring seal 42. A cylindrical wall 36f together with an outer annular portion 36g of the disk-like end 36a of the support member 36 connects the two cylindrical surfaces 36a and 36d. The wall 36f together with the central portion 36h of the disk-like end 36a of the support member define an interior space 44 within the support member.

A piston-like valve member 46 which is generally hollow and has a substantially open sleeve-like upstream end is slidably mounted on the support member 36. More specifically, the valve member has an annular upstream end surface 46a which mates with the valve seat 30 to control the flow of fluid through the inlet 37. The inner surface of a cylindrical wall 46b on the open upstream end of the valve member slidably engages the outer cylindrical surface 36b on the support member 36. The inner surface of a second but smaller diameter cylindrical wall 46c on the valve member downstream from the wall 46b slidably engages the inner cylindrical bearing surface 36d on the support member 36. The cylindrical walls 46b and 46c on the valve member are joined by an annular segment 46d, the downstream face 46e of this segment including the main portion of a working surface of the piston-like valve member 46. Together, the valve member 46 and the support member 36 define a cavity 48 with an upstream boundary of the cavity being formed by the seal 40 extending between mating cylindrical surfaces 36b and 46b of the valve member and the support member and a downstream boundary formed by the seal 42 between the inner cylindrical surface 36d of the support member 36 and the inner surface of the cylindrical wall 46c of the valve member 46.

Figure 5:
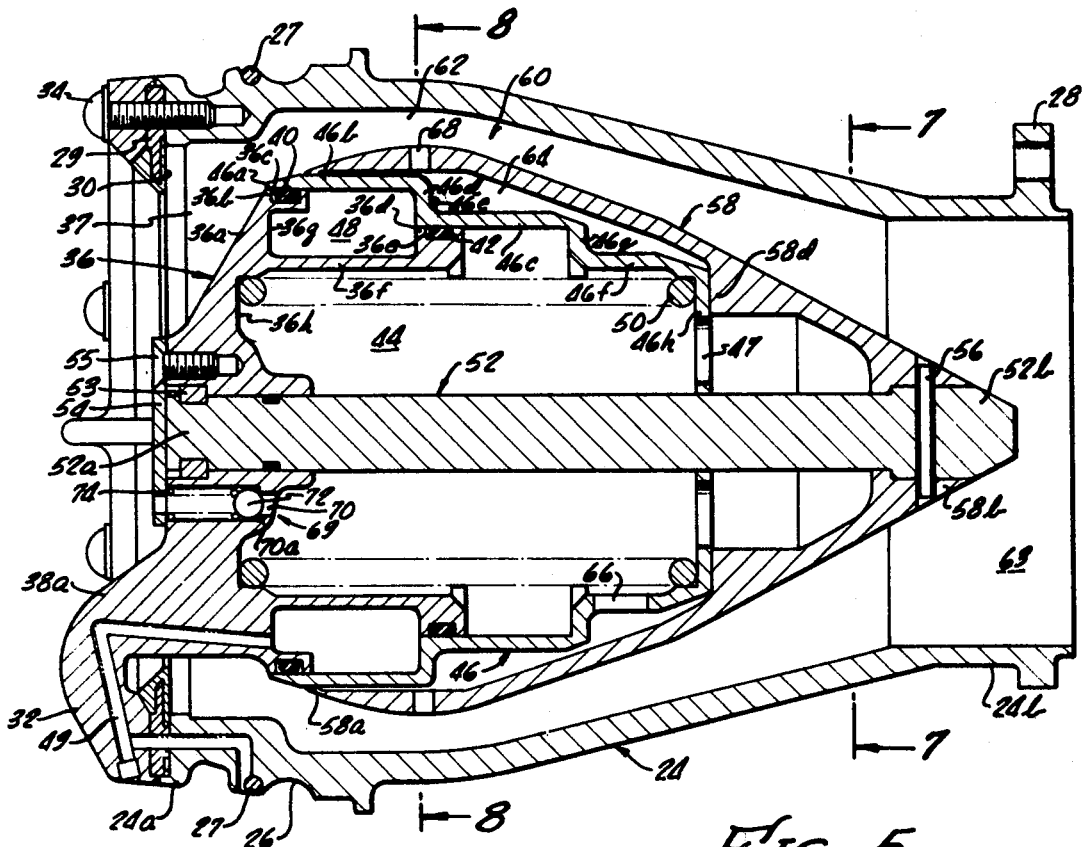
FIG. 5 is a longitudinal cross-sectional view of the regulator on line 5—5 of FIG. 4 with the valve member shown in the fully open position.

Referring to FIG. 5, an ambient sensing port or passage 49 is formed in the wall 36g of the support member 36 and one of its ribs 36a, with the port connecting the ambient cavity 48 and the exterior of the housing such that the pressure within the cavity is bled to the surrounding atmospheric pressure.

Figure 7:
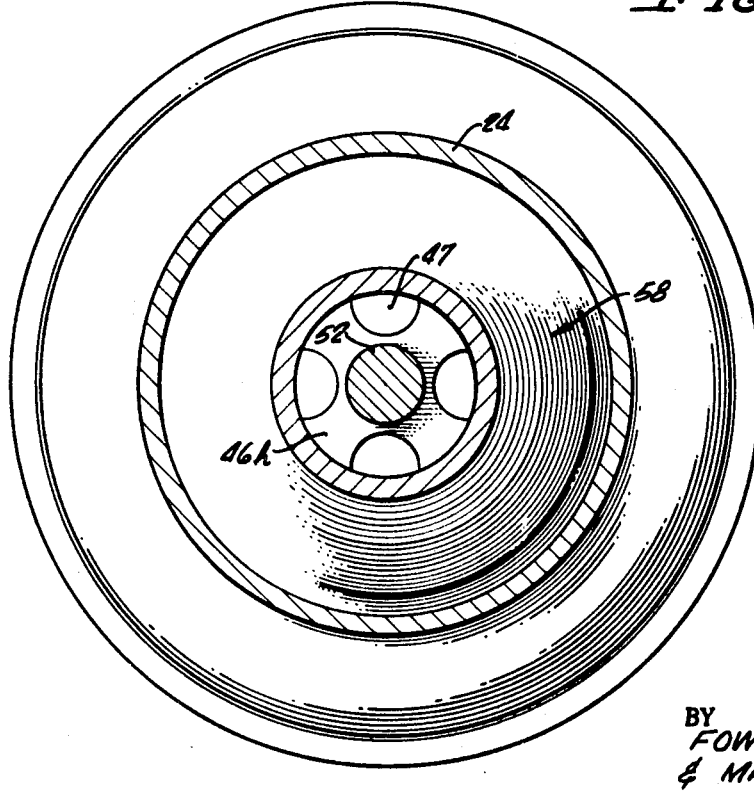
FIG. 7 is a cross-sectional view of the regulator taken on line 7—7 of FIG. 5 which illustrates the area of the flow path at that location.

The valve member 46 is further formed with a third cylindrical wall 46f downstream from the second wall 46c and connected to the wall 46c by an annular segment 46g. A downstream end wall 46h is joined to the cylindrical wall 46f and is formed with a plurality of openings 47, as seen in FIGS. 5 and 7.

The interior of the valve member 46 forms an extension of the space 44 in the support member 36. A coil spring 50 is positioned within the space 44 with the upstream end of the spring engaging the central portion 36h of the support member and the downstream end of the spring engaging the inside surface of the end wall 46h of the valve member 46 so that the valve member is urged away from the valve seat 30 into its open position as shown in FIG. 5.

Still referring to FIG. 5, there is shown a shaft 52 centrally positioned within the housing having its upstream end 52a extending into a bore in the support member 36 and attached to the support member by a suitable retaining ring 53 and by a plate 54 extending over the upstream end of the shaft attached by threaded fasteners 55 to the supporting member. The shaft extends downstream through the cavity 44 and an opening in the end wall 46h of the valve member 46, thus being supported in cantilever fashion by the support member.

Attached to the downstream end of the shaft 52 by a transverse pin 56 is the downstream end 58b of a generally hollow shroud 58 having a substantially open upstream cylindrical end 58a slidably engaging the outer cylindrical surface on the wall 46b near the upstream end of the valve member. As may be seen in FIG. 5, the exterior of the shroud smoothly increases in diameter from the upstream end 58a to its largest diameter spaced slightly downstream from the upstream end, and then tapers smoothly in a downstream direction to a small diameter downstream end. An outlet 63 is at the downstream end of the shroud. The exterior profile of the shroud can be smoothly curved, or for machining convenience may be formed by a pair of straight profile sections as shown in FIG. 5.

The shroud 38 is spaced from the surrounding housing 24 so that an annular flow path 60 is defined by the shroud and the housing with this flow path being a continuation of the inlet 37 and adjacent flow path extending from the valve seat 30. As can be seen, both the housing 24 and the shroud 58 taper to smaller diameters from the area of the large diameter of the shroud near the upstream end, but the shroud tapers at a more rapid rate than the housing. The result is that near the large diameter portion of the shroud, there is formed a restricted throat 62, and the area of the flow path increases in a downstream direction from this throat even though both diameters of the flow path decrease. This may be seen in FIG. 5 by comparing the flow path along lines 7—7 and 8—8. This may also be seen by comparing the throat 62 in FIG. 8 with the path in FIG. 7 as defined by the cross-sectional portions of the housing 24 and the shroud 58. In effect, the shroud and the housing form a converging diffuser.

Figure 6:
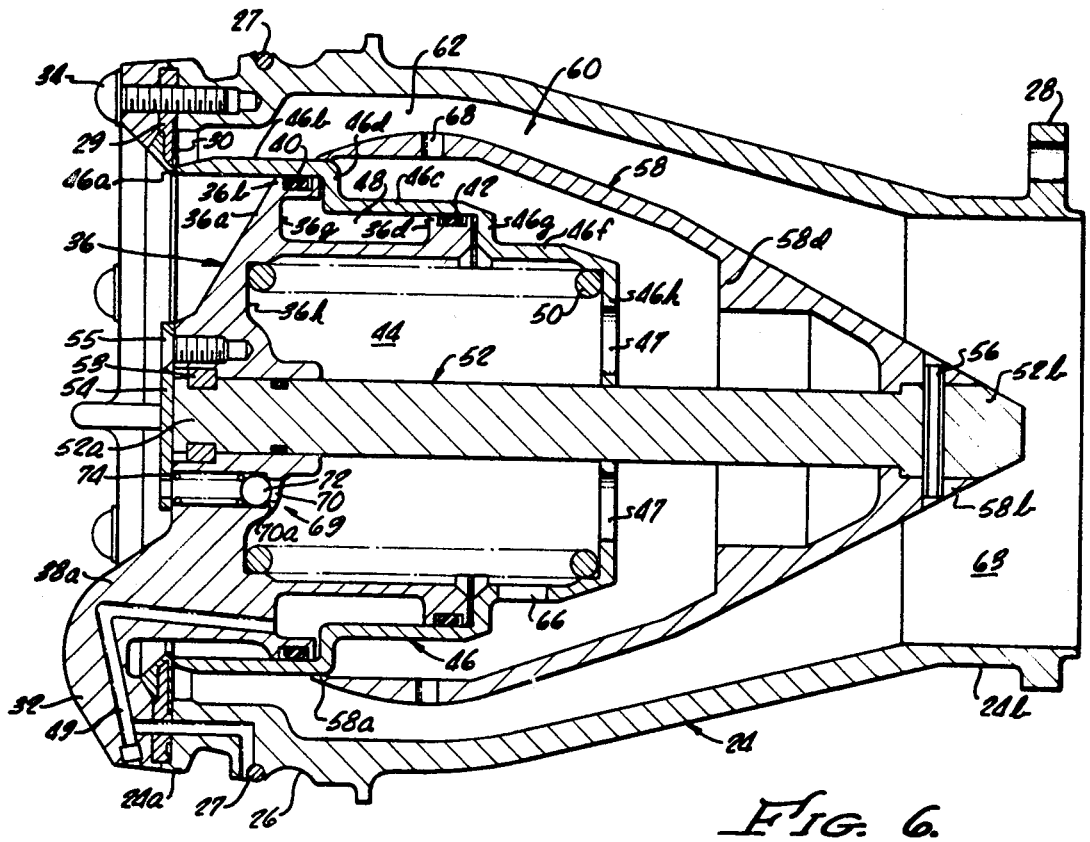
FIG. 6 is a view like that of FIG. 5 with the valve member shown in the fully closed position.

As can be seen from FIG. 5, the extreme upstream end of the shroud engages the cylindrical surface 36b of the support member; however, immediately downstream of this, the interior surface of the shroud is of slightly larger diameter and extends beyond the cylindrical wall 46b of the valve member. The interior of the shroud then tapers to a smaller diameter in the downstream direction; however, the interior surface is spaced from the valve member 46 as shown in FIG. 6. Hence, the shroud can accommodate movement of the valve member.

The interior of the shroud cooperates with the valve member to define a working chamber 64; and since there are openings 47 formed in the downstream end wall 46h of the valve member and an opening 66 in the side wall 46f as seen in FIGS. 5 and 7, the working chamber is in open communication with the interior space 44 within the valve member and the support member. Hence, only the annular ambient pressure cavity 48 is sealed from the chamber 64.

Figure 8:
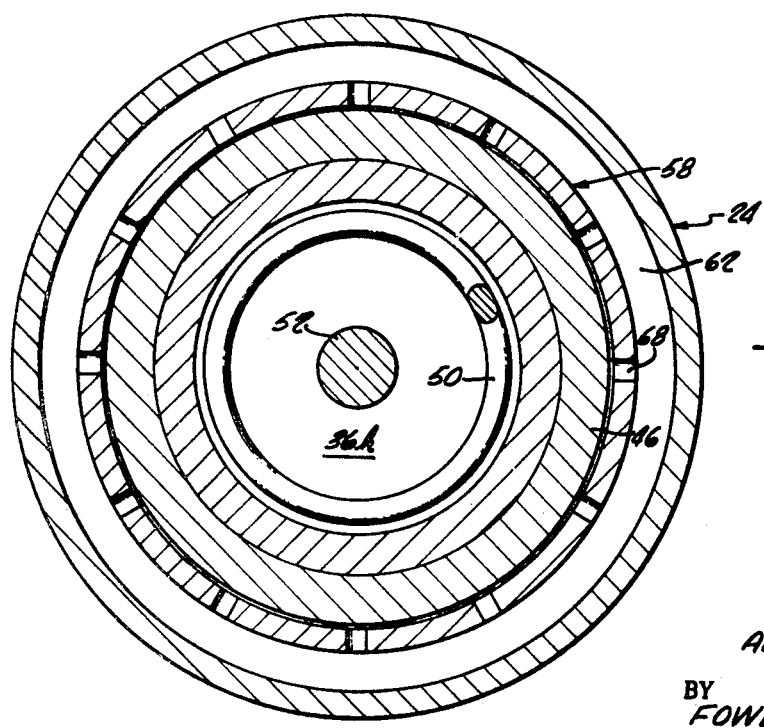
FIG. 8 is a cross-sectional view on line 8—8 taken through the sensing holes in the shroud and illustrating the cross-sectional area of the flow path at that point.

Referring to FIGS. 5 and 8, it may be seen that the shroud 58 is formed with a plurality of sensing holes 68 circumferentially spaced around the shroud and extending through the side wall of the shroud so that the pressure in the surrounding flow path is transmitted into the working chamber 64 within the shroud. Note that the sensing holes are located in the restricted throat 62 of the flow path 60.

The interior of the shroud is formed with an annular shoulder 58d near its downstream end 38b which is of a diameter smaller than that of the downstream end of the valve member 46. Consequently, this shoulder 58d serves as a stop to limit the opening movement of the valve member caused by the coil spring, as seen in FIG. 5.

To relieve pressure which can build up within the working chamber and within the shroud due to line surges, there is provided a check valve 69 comprising a passage 70 extending axially through the central portion 36h of the support member and the plate 54 over the end of the shaft 52. A ball valve member 72 is urged by a spring 74 against a valve seat 70a near the upstream end of the passage 70. When the pressure within the working chamber is greater than the upstream pressure, the check valve will open; however, no flow can occur in the opposite directions.

OPERATION

In operation, the valve member 46 normally is open, in the condition shown in FIG. 5 in view of the urging of the spring 50. The regulator is set to regulate the fuel flow to the aircraft and to prevent a pressure build-up within the aircraft fuel system beyond a certain maximum. For example, the regulator may be set to close when its valve member is subjected to a closing pressure of fifty p.s.i.g.

As the fuel flows through the regulator and into the aircraft, the pressure builds up within the regulator flow path 60 and this pressure is applied through the holes 68 into the working chamber 64 within the shroud and against the valve member walls 46e, 46g and 46h. However, since this pressure is applied to both sides of the walls 46g and 46h, in view of the holes 47 and 66 in the valve member, the only working surface effective to move the valve is that axially facing portion of the valve extending between the inner diameters of the walls 46b and 46c. Or, in other words, the total working surface effective to move the valve member is the difference between the circular area defined by the cylindrical surface 36b on the support member 36 and that defined by the cylindrical surface 36d. As explained, the upstream face of the wall 46d which is opposite to the working surface is subjected to the ambient pressure within the cavity 48. Hence the pressure sensed through the sensing holes 68 urges the valve member 46 in a closing direction opposite to the force of the spring 50.

The pressure in the throat 62 of the flow path 60 is related to the downstream pressure near the outlet 63 and the pressure within the aircraft; however, since the valve member 46 is positioned within the shroud, it does not sense directly the downstream pressure. Instead, the pressure sensed by the regulator is that which is ducted through the sensing holes 68. Since the sensing holes 68 are located adjacent the restricted throat 62, a venturi effect is created. That is, the velocity of the fuel through the throat past the sensing holes 68 is greater than that downstream of the throat 62 with the result that the pressure at the throat is lower than the pressure downstream of the throat. Thus, in effect, the valve member 46 is subjected to an artificially low pressure at high velocities in the sense that the true pressure within the aircraft fuel system is somewhat higher than that within the shroud 58. As explained above, this arrangement is desirable because at high flow rates, a regulator without the shroud tends to have pressure deterioration and the desired flow rate is not obtained.

If the pressure increases beyond the desired maximum, the regulator valve begins to close. It is shown in FIG. 6 in its fully closed position. Once the pressure is relieved, the valve member is once more forced into its open position by the coil spring 50. Occasionally line pressure surges can cause downstream pressure to rise rapidly and hence it is important that the regulator valve react quickly and close to prevent damage to the aircraft. To this extent, the total area of the sensing holes 68 should be sufficient to enable the valve to be an effective surge suppressor. In a preferred form of the valve, 12 holes of about 3/16 diameter are employed making a combined area of .332 square inch.

When such line pressure surges occur, the pressure downstream of the valve seat 30 can actually exceed that on the intake side. If this condition should occur, the check valve 69 in the support member will open to relieve such pressure.

If fuel should leak past the dynamic seal 40 at the upstream or intake end of the valve member 36, it does not bleed into the downstream side so as to distort the pressure regulation function; instead, it bleeds into the ambient cavity 48 which is open to the exterior of the housing through the ambient sensing port 49. Similarly, if there is any leakage on the downstream side from the pressure within the shroud working chamber 64 past the other dynamic seal 42, the fuel leaks into the cavity 44 and is vented to the exterior through the port 49. It has been found that such fuel leakage is quite small, but in any event it does not affect the accuracy of the regulator.

It should be noted that the size of the cavity varies depending upon the position of the valve member. Thus, in FIG. 6 with the valve in a closed position, the size of the cavity is considerably reduced. However, the cavity has been designed to have adequate capacity even in this closed position.

Figure 9:
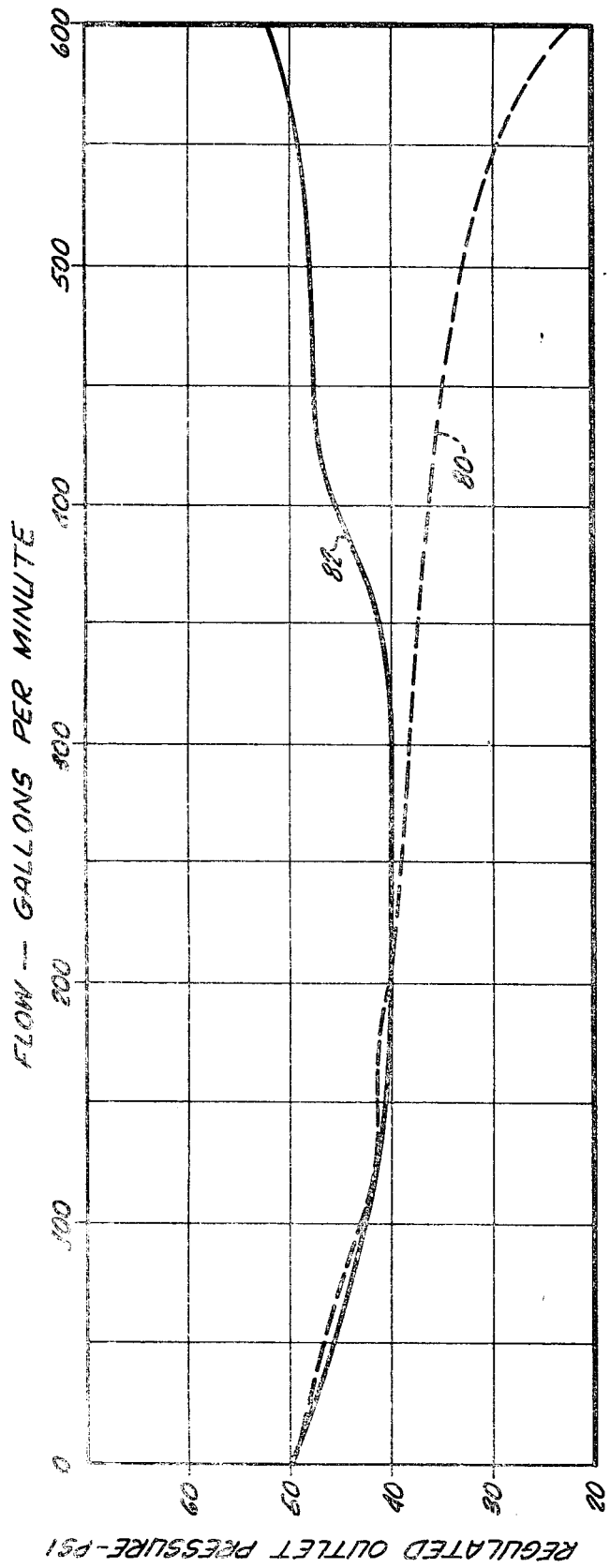
FIG. 9 is a schematic view showing the profile of the flow path through the regulator.

To further describe the construction and operation of the regulator valve, the flow path 60 has been marked by 13 stations in FIG. 9 and the cross-sectional area of the flow path for a working example of a valve made in accordance with the invention, is given in the second column of the following table for each of the stations listed in the first column.

| Station | Area, in.² | Ft./sec. at 500 g.p.m. | Velocity pressure, p.s.i. |
|---|---|---|---|
| (1) | 6.224 | 25.7 | 3.52 |
| (2) | 4.778 | 33.6 | 6.00 |
| (3) | 5.715 | 28.1 | 4.20 |
| (4) | 5.228 | 30.7 | 5.02 |
| (5) | 3.181 | 50.3 | 13.48 |
| (6) | 3.544 | 45.3 | 10.90 |
| (7) | 3.896 | 41.3 | 9.09 |
| (8) | 4.055 | 39.6 | 8.34 |
| (9) | 4.672 | 34.4 | 6.30 |
| (10) | 5.233 | 30.7 | 5.02 |
| (11) | 5.339 | 30.2 | 4.85 |
| (12) | 5.960 | 27.0 | 3.89 |
| (13) | 6.438 | 25.0 | 3.33 |

Thus it can be seen that the area is the smallest at station 5 which is the throat 62 of the flow path, and that the area increases gradually in a downstream direction from the throat.

In the third column of the table is listed the velocity of the fluid with a pump set to deliver 500 gallons per minute. As can be seen, the velocity at the throat is about double the velocity at station 13 at the outlet 63 of the housing.

The fourth column of the table lists the velocity pressure head sensed at the various stations, and as can be seen, the velocity pressure head at station 5 is about four times the velocity pressure head at station 13. Consequently, a rise in static pressure occurs at the outlet or station 13 equal to the difference between the velocity pressure heads less some minor loss to diffuser inefficiencies.

Figure 10:
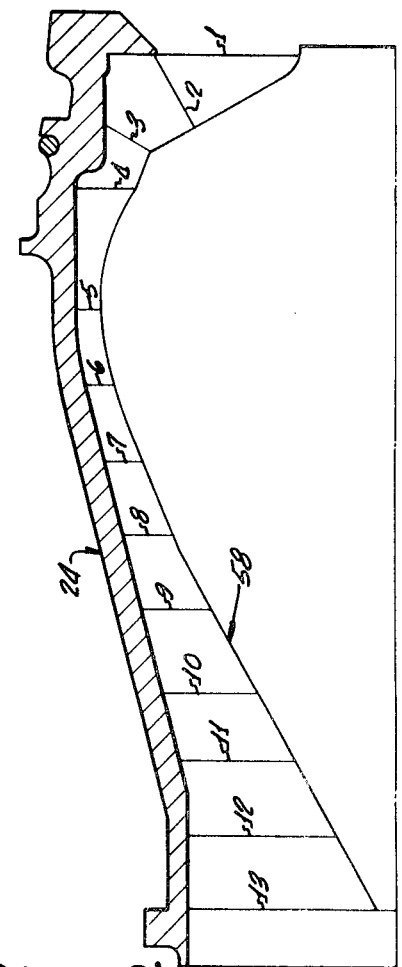
FIG. 10 is a graph illustrating the characteristics of the regulator of the invention compared to a known regulator.

Referring to the graph of FIG. 10, with the construction described it has been found that the pressure deterioration is about the same as previously known regulators up to about 200 g.p.m. flow rate. However, the pressure curve 80 of the known regulator continues to deteriorate as the flow rate increases, whereas the curve 82 for the regulator described herein levels off and then begins to rise such that at 500 g.p.m. the pressure is almost to 50 p.s.i. and reaches 50 when close to 600 g.p.m.

Note from the table that the velocity pressure is a squared function of the flow rate and area. By contrast, the recovery rate of the regulator spring 50 is linear. It is believed that this is the reason that a rising pressure curve occurs at high flow rates with the regulator described, and as shown in the graph of FIG. 9.

Another feature of the regulator is that the performance described can be attained with a relatively lightweight, compact structure which is important for ease of handling. For example, the entire length of the regulator unit referred to above is only about seven inches. Also, the weight of the unit is only about four pounds.

What is claimed is:

1. A pressure regulator valve comprising:
   a tubular housing;
   a support member attached to the housing and extending inwardly into the housing, the central portion of the support member being spaced from the housing walls to define an annular flow path;
   means defining an annular valve seat on a wall of said flow path;
   a valve member slidably mounted on said support member in a manner to cooperate with said valve seat for controlling flow through said flow path;
   a hollow shroud closed on one end and substantially open on its opposite end centrally positioned in the housing and spaced from the housing to form a continuation of said annular flow path through the housing, a portion of said valve member being slidably received within said shroud, the interior of the shroud and a portion of the valve member positioned within the shroud being formed to define a working chamber with a working surface of the valve member forming a wall of the chamber; and
   means defining one or more sensing holes in said shroud placing said flow path in communication with said chamber so that the fluid pressure transmitted through the sensing holes reacts against the working surface of the valve member to urge the valve member to move in response to the pressure.

2. The valve of claim 1 where in said shroud is located downstream of said valve seat with its open end facing upstream, and the shroud and the housing are formed such that the flow path includes a throat of restricted area and a diffuser portion of increasing area downstream from the throat; and said sensing holes are located near the throat of the shroud such that the working surface of the valve member is subjected to the low pressure in the flow path resulting from the high velocity produced due to the throat in the flow path.

3. The valve of claim 2 wherein the area of said diffuser portion of the flow path increases smoothly to create a smooth static pressure build-up and velocity reduction.

4. The valve of claim 1 wherein:
   said shroud is located downstream of said valve seat with its open end facing upstream;
   said support member has a pair of cylindrical surfaces which are slidably engaged by a pair of cylindrical walls in the valve member, the support member and said valve member being formed to define a cavity with said engaging walls and surfaces forming dynamic seals for the cavity, one of said seals being exposed to pressure in said flow path adjacent the upstream end of said valve member, and the other of said seals being exposed to pressure within said working chamber; and including
   means defining an ambient sensing port extending through said support member from said cavity to the exterior of the housing so that leakage past either of said seals is ducted to the exterior of the housing.

5. The valve of claim 1 including yieldable means urging said valve member in a direction opposite to said fluid pressure.

6. An aircraft fueling pressure regulator valve to be positioned at the end of a fueling hose having a tubular housing to be connected to the hose, an inwardly extending valve seat near the upstream end of the housing, a support member centrally positioned within the housing near the upstream end of the housing and supported by radial strut means attached to the housing, the support member having a substantially closed end facing upstream and spaced from the housing to define an annular inlet, a pressure regulator piston having an open upstream end slidably mounted for reciprocation on said support member, the upstream end of said piston forming a sleeve-like valve member which cooperates with said valve seat to control fluid flow through said inlet, yieldable means urging said valve member away from said valve seat, said piston and the support member defining a cavity sealed from pressure within the housing, and means defining an ambient sensing passage connecting said cavity to the exterior of said housing, the improvement comprising:
   a shroud enclosing the downstream end of said piston and having an open upstream end which slidably engages the outer cylindrical wall on the upstream of the piston, interior portions of the shroud being spaced from downstream portions of said piston and support member to define a working chamber for said piston, the shroud exterior being spaced from the housing, to define an annular flow path, the configuration of the shroud and the housing being such that the cross-sectional area of the flow path increases in a downstream direction from a restricted throat, means defining one or more sensing holes in the throat area of the shroud leading to the working chamber for transmitting throat pressure to a working surface on said piston to enable the pressure to move the piston against the urging of said yieldable means to control the flow of fluid through the valve in accordance with the combined effect of the throat pressure and the yieldable means.

7. The valve of claim 6 wherein said shroud smoothly tapers to a small diameter, closed downstream end.

8. A regulator valve for regulating downstream pressure while fueling a power plant such as an aircraft comprising:
   a tubular housing:
   means defining an annular valve seat on the inner wall of said housing, a support member attached to the housing upstream of the valve seat and extending inwardly into the housing and through the valve seat, the central portion of the support member being spaced from the valve seat to define an annular inlet;
   a valve member slidably mounted on said support member in a manner to cooperate with said valve seat for controlling flow through said inlet; and
   a shroud having an open upstream end slidably engaging the outer periphery of said valve member, the shroud smoothly tapering from its largest diameter near its upstream end to a closed small diameter downstream end, the shroud being spaced from the surrounding housing to form an annular flow path which increases in cross-sectional area in a downstream direction from the shroud largest diameter, and said shroud having a plurality of sensing holes spaced around its periphery near its largest diameter so that fluid pressure from the surrounding flow path is sensed by the valve member within the shroud.

9. The valve of claim 8 wherein said housing converges from the area surrounding said sensing holes to the downstream end of the shroud and said shroud converges at a sharper rate than the housing in the downstream direction with the result that the flow path from the area of the sensing holes increases in a downstream direction such that a converging diffuser effect is created.

10. The valve of claim 8 including spring means extending between said support member and said valve member urging the valve member away from its valve seat.

11. The valve of claim 8 wherein said shroud includes stop means formed on its inner surface and engageable by the valve member to limit the downstream movement of the valve member.

12. The valve of claim 8 including a shaft attached to the supporting member and extending downstream through an opening in the end of the valve member, the downstream end of said shroud being attached to said shaft for support.

13. The valve of claim 8 wherein said valve member has an open upstream end forming a first cylindrical wall which is slidably mounted on an outer cylindrical surface on said support member, said support member having an inner cylindrical surface spaced inwardly and downstream from its outer cylindrical surface, said valve member having a second cylindrical wall slidably engaging said inner cylindrical surface and said valve member and said support member being formed so that an annular cavity is defined by the two members extending between said inter-engaging cylindrical surfaces; and means defining an ambient sensing port extending through said support member and opening into said cavity so that leakage past said mating cylindrical walls and surfaces is bled to the exterior of said housing through said ambient sensing port.

14. The regulating valve of claim 13 wherein said first and second cylindrical surfaces on said valve member are joined by an annular surface which forms a working surface which senses the pressure communicated through the sensing holes, the portion of said valve members downstream of said second cylindrical surface having one or more openings therethrough so that the entire space within the shroud is in open communication with the sensing holes except said ambient cavity.

15. The valve of claim 13 wherein said valve member has a third cylindrical wall spaced inwardly and downstream from said second cylindrical wall, and said valve member has a downstream end wall attached to the third cylindrical wall; and including a coil spring positioned within said valve member inwardly from said cylindrical walls and surrounding said shaft, with one end of the spring engaging the downstream end wall of the valve member and the other end of the spring engaging said support member.

16. A pressure regulator having a tubular housing, a support member attached to the housing and extending inwardly into the housing, the center portion of the support member being spaced from the housing walls to define an annular flow path through the housing, means defining an annular valve seat on a wall of said housing, a valve member having an open upstream end slidably mounted on said support member in a manner to cooperate with said valve seat for controlling fluid flow through said flow path, the improvement comprising:

said support member and said valve member being formed to define a cavity having a first sliding seal boundary formed by slidably engaging surfaces of the support member and the valve member with the seal being exposed to fluid pressure in said flow path near the valve seat, and said cavity having a second sliding seal boundary formed by slidably engaging surfaces of said valve member and said support member spaced downstream from the first seal and being exposed to pressure in said flow path spaced downstream from the first seal; and means defining an ambient sensing port extending through said support member from the exterior of the housing and opening into said cavity so that leakage past said seals is bled to the exterior of the housing through said ambient sensing port.

17. The pressure regulator of claim 16 wherein said cavity has an annular shape, said support member has a first cylindrical surface downstream of said valve seat and the open end on said valve member forms a first cylindrical wall which slidably engages said outer surface to form said first seal boundaries for said cavity, and said support member has a second cylindrical surface spaced inwardly from and downstream from the first cylindrical surface, and said valve member has a second cylindrical wall slidably engaging said second cylindrical surface to form said second seal, said first sealed boundary being exposed to the fluid pressure in said flow path and said second sealed boundary being exposed to fluid pressure from said flow path downstream from the first sealed boundary.

References Cited
UNITED STATES PATENTS

| | | | |
|---|---|---|---|
| 2,044,437 | 6/1936 | MacPherson | 137—220 |
| 2,198,487 | 4/1940 | Sisk | 137—504 |
| 2,442,625 | 6/1948 | Thomas | 137—219 |
| 3,016,046 | 1/1962 | Backofen | 137—484.4X |
| 3,170,481 | 2/1965 | Presnell | 137—504X |
| 3,173,441 | 3/1965 | Elbogen et al. | 137—220 |
| 3,362,424 | 1/1968 | Smith et al. | 137—220 |

M. CARY NELSON, Primary Examiner

R. J. MILLER, Assistant Examiner

U.S. Cl. X.R.

137—502